2,745,723

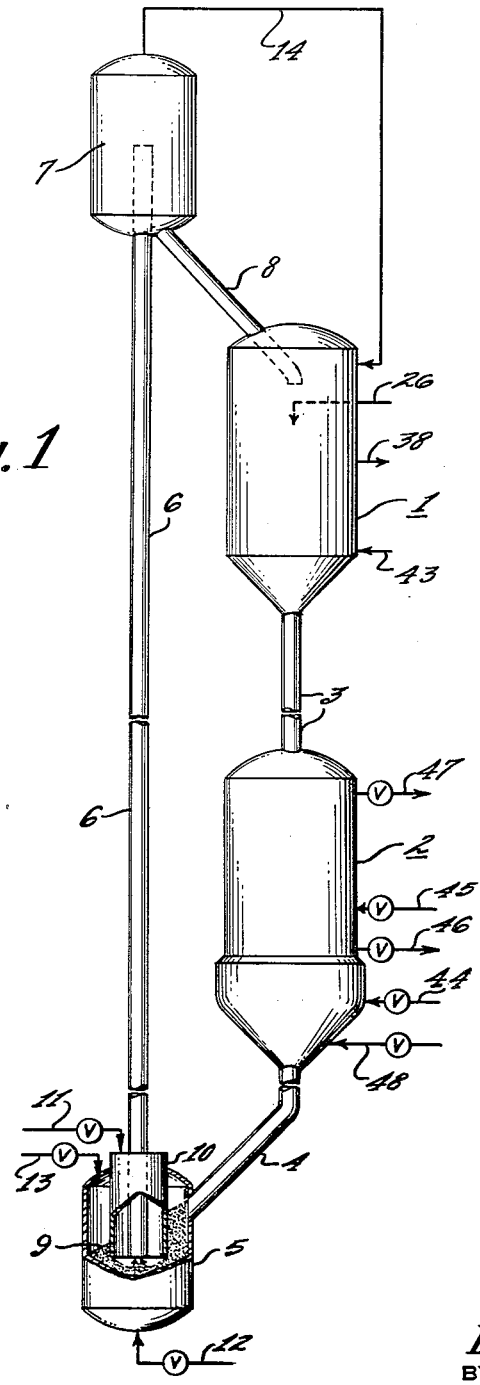

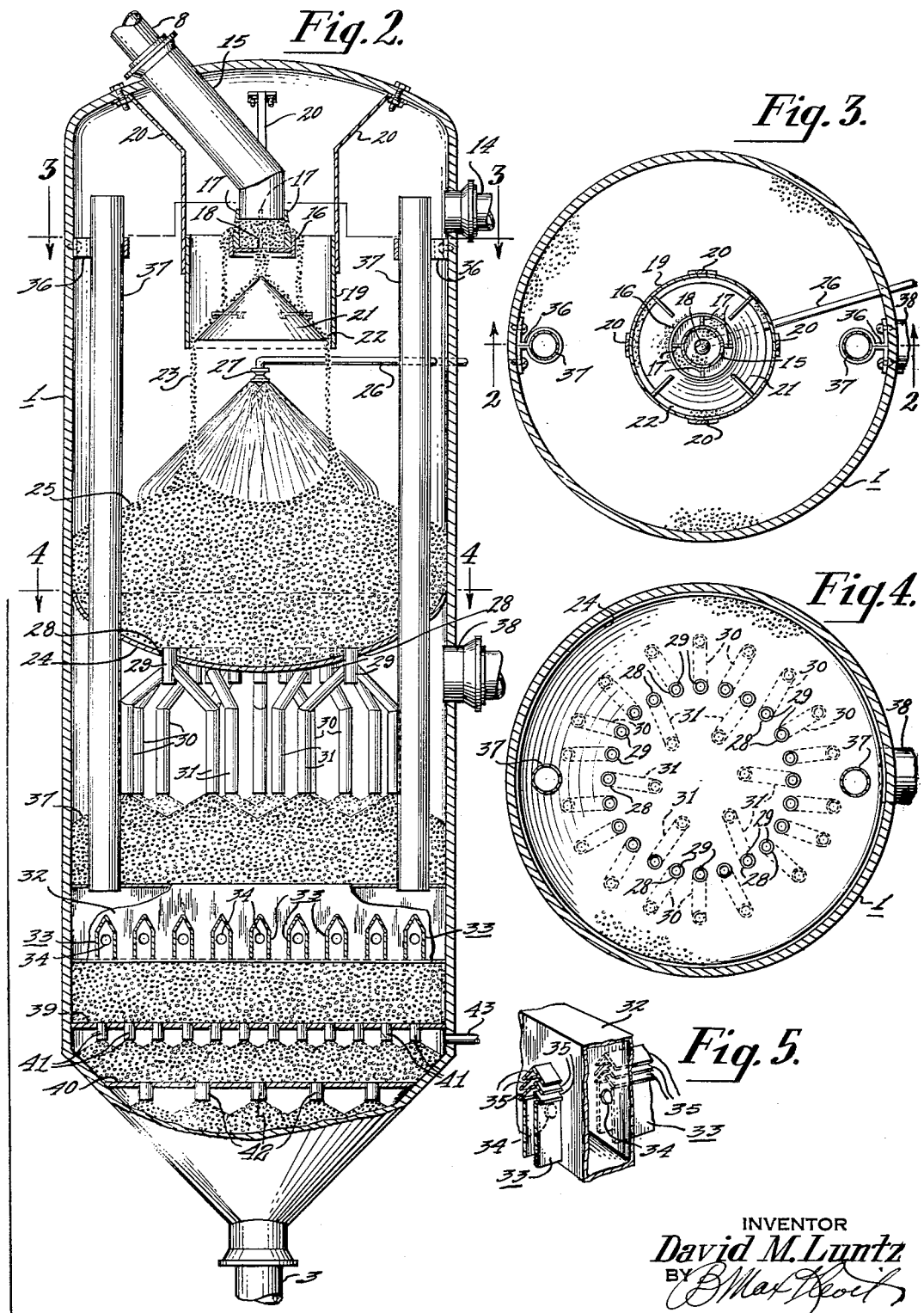
May 15, 1956  D. M. LUNTZ  2,745,723
APPARATUS FOR THE CONVERSION OF LIQUID HYDROCARBONS
Filed April 12, 1950  2 Sheets-Sheet 2
INVENTOR
David M. Luntz
ATTORNEY United States Patent Office 2,745,723
Patented May 15, 1956

APPARATUS FOR THE CONVERSION OF LIQUID HYDROCARBONS

David M. Luntz, Philadelphia, Pa., assignor to Houdry Process Corporation, Wilmington, Del., a corporation of Delaware Application April 12, 1950, Serial No. 155,536

5 Claims. (Cl. 23—288)

The present invention relates to hydrocarbon conversion systems and has particular reference to a novel arrangement and operation of the reactor in such systems. More particularly the invention is concerned with operations wherein liquid hydrocarbons are vaporized, and partially chemically converted by contact at reaction temperature with granular catalyst or other granular contact mass.

In accordance with the invention hydrocarbons in liquid state are engaged with freshly regenerated catalyst or other hot contact mass in granular state in a vaporizing zone above a compact bed reaction zone. The descending contact mass is thereafter accumulated to form a compact gravitating bed thereof below the vaporizing zone, and the hydrocarbon vapors derived from the described contact vaporization of the liquid are then further converted or processed by being passed upwardly through the bed in countercurrent relation to the descending compact mass and together with any additional hydrocarbon vapors desired to be converted or processed by contact with the compact bed of granular contact material.

The invention is generally adapted to be practiced in arrangements wherein contact mass, such as catalyst, is circulated through a system including a hydrocarbon conversion zone, and through a regeneration zone wherein carbonaceous deposit formed therein during hydrocarbon conversion is burned, the regenerated catalyst being subsequently returned to the hydrocarbon conversion zone. A particular type of system wherein the invention finds special additional advantages is in one wherein the freshly regenerated catalyst while being returned to the principal conversion zone is passed upwardly through a vertical path while suspended by a vapor stream including hydrocarbon vapors. The suspending vapors as well as the hydrocarbon vapors formed in the liquid vaporizing zone are then together passed upwardly through the descending compact bed of contact mass for further conversion thereby. While the suspending hydrocarbon vapors are in contact with the ascending contact mass, these vapors are heated by direct heat exchange with the contact mass and may be cracked or otherwise converted thereby to desired extent.

The invention will be best understood by reference to the accompanying drawings illustrating an embodiment thereof wherein:

Figure 1 is a diagrammatic representation of the layout of a preferred system in which the invention may be practiced and illustrating the flow of certain of the principal fluids employed;

Figure 2 is a vertical cross-section through a novel reactor of the invention;

Figures 3 and 4 are transverse sections taken respectively on lines 3—3 and 4—4 of Figure 2; and Figure 5 is an enlarged perspective view of a detail shown in Figure 2.

Referring now particularly to Figure 1, the illustrated system comprises a reactor or conversion vessel 1 and a regenerating vessel or kiln 2, in solids flow communication by a connecting conduit 3. The kiln 2 discharges at the bottom thereof into a conduit or seal leg 4 which in turn feeds to a lift transfer hopper 5. Rising vertically from within the hopper 5 and extending to a height above the top of vessel 1 there is shown a lift conduit 6. This conduit has its upper extremity within a separating or disengaging vessel 7 and the vessel 7 is in solids flow communication with the conversion vessel 1 by means of a connecting conduit 8, having its inlet at or near the bottom of vessel 7 and its outlet within the vessel 1.

In the operation of this system as applied to catalytic cracking of a hydrocarbon charge stock for instance, freshly regenerated catalyst discharged from the kiln 2 passes by gravity through the conduit 4 into the lift transfer hopper 5 forming a bed therein, assuming a level therein determined by the normal angle of repose of the solid material as indicated at 9, which level is above the bottom of lift conduit 6. The lower portion of that conduit which is within the hopper 5 is surrounded by a concentric sleeve 10 open only at the bottom thereof. The bottom of sleeve 10 terminates at the same level with the bottom of conduit 6 or at a point somewhat above or below that level.

Hydrocarbon vapors are admitted through line 11 into the sleeve 10 near the top thereof and pass down the annular channel formed between the sleeve and conduit 6, discharging as an annular stream into the bed of catalyst in hopper 5 and then reversing direction to pass upwardly into the lift conduit 6. In so doing the vapor stream picks up catalyst engaged thereby in the bed and transports the same into the lift conduit. A gas or vapor stream which may be hydrocarbons or other compatible gas such as steam or inert gas, is also admitted in small amounts and at comparatively low velocity into the bottom of hopper 5 through a line 12 to diffuse through the catalyst bed, thus facilitating lifting of catalyst by the annular vapor stream entering the bed at the bottom of sleeve 10. To prevent flow of hydrocarbon vapors from the transfer hopper 5 upwardly into conduit 4, a seal gas is introduced into the conduit. Such seal gas, which may be steam for instance or an inert gas, may be admitted through line 13 into the space unoccupied by solids above the level 9 of the catalyst bed in the hopper. A part of the gas thus admitted will pass up the seal leg 4 but in an amount insufficient to significantly impede catalyst flow therein, while the remainder of the gas, in an amount determined by fixing pressure differentials, will pass into the bed in vessel 5 and upwardly therefrom into the lift conduit 6.

The vapors admitted into lift conduit 6 together with the catalyst suspended thereby passes upwardly through the lift conduit and enters the disengaging vessel 7, wherein due to the reduction in velocity as a result of the expanded cross section within that vessel, the catalyst settles out from the impelling influence of the gas and gravitates to the bottom of the vessel. The disengaged gas is removed from the top of the vessel by a line 14, while the catalyst is discharged from the vessel through conduit 8 into the top of reactor 1.

Details of the reactor are more fully illustrated in Figures 2–5. As shown in Figure 2, conduit 8 by means of an appropriate coupling connects with an inlet conduit 15 passing through the top of reactor 1 through which catalyst is discharged into the reactor. A shallow tray 16 is supported from conduit 15 by tie members 17, the tray being slightly larger in diameter than the discharge outlet of the conduit. The bottom of the tray is provided with central opening 18 through which a portion of the catalyst filling the tray is discharged, while the remainder of the catalyst overflows the peripheral wall of the tray.

A concentric open ended housing 19, spaced radially from the wall of the tray and surrounding the same, is supported in the reactor 1 by suitable hangers 20. A conical distributing member 21, is supported within the housing by suitable brackets and is arranged with its apex in line with the center of the opening 18 and spaced therebelow. The base of the cone is spaced laterally from the surrounding wall of housing 19 and thus provides between the base of the cone and the internal wall of the housing an annular passage 22. The catalyst passing through the opening 18 in the tray member 16 as well as the catalyst overflowing the peripheral wall thereof, is discharged through the passage 22 as an annular stream or curtain 23.

Within the reactor 1, at a suitable distance below the base of the cone member 21, a tube sheet 24 is provided, extending across the reactor and forming a horizontal partition therein. The catalyst discharged from the housing 19 forms a bed supported on the surface of tube sheet 24, the upper surface 25 of which is below the bottom of housing 19. A pipe 26 terminating in a spray nozzle 27 in line with the apex of the cone and spaced below the base thereof is provided at a height above the surface 25, and arranged to discharge liquid hydrocarbons onto the surface of bed 25.

Instead of directing the liquid hydrocarbons from nozzle 27 onto the surface 25 of the bed, in some instances it may be desired to spray the liquid, preferably in atomized or finely divided condition or as a mixed phase of liquid and vapor, into the annular stream of catalyst 23 as it falls toward the surface of the bed. In so doing, the spacing of the base of the cone 21 from the inner wall of the housing 19 will be such as to provide a relatively thick curtain of the freely falling catalyst discharged through the passage 22, to entirely or at least sufficiently to prevent passage therethrough of any of the liquid discharged into engagement therewith by the spray nozzle 27. By this arrangement, employing a catalyst curtain of sufficient thickness, migration of atomized liquid material to deposit on interior surfaces within the reactor 1 is minimized, avoiding deleterious formation of carbonaceous deposit on such surface.

The tube sheet 24 is provided with openings therein arranged in a predetermined pattern to effect substantially uniform discharge of catalyst from the bed thereabove. As shown, in the present instance, these openings 28 are arranged in a single circle (see Figure 4) and have short downcomer nipples 29 fixedly mounted therein, by welding or other suitable manner. Each of the nipples 29 is provided with a depending downcomer, and all of these downcomers are arranged in a suitable pattern for uniform distribution of catalyst at the discharge outlets thereof over the cross section of the reactor therebelow. Thus, as shown, certain of the nipples 29 have downcomers 30 directed outwardly from the circle formed by the openings 28, while a lesser number of the nipples 29 are provided with downcomers 31 directed inwardly from that circle, both sets of downcomers discharging catalyst at a substantially common level, so that the outlets of the downcomers 30 form a circular series which is concentric with the circular series formed by the outlets of the downcomers 31, as illustrated in Figure 4.

At a suitable distance below the discharge outlets of downcomers 30 and 31 there is provided across the reactor 1 and suitably mounted therein a hollow beam 32 of relatively narrow cross section. Spaced inverted channel members 33 intersect the side walls of the beam and extend laterally from the sides thereof toward the inner periphery of the reactor, as is particularly illustrated in Figure 5. The interior of the beam is connected to the interior of the inverted channel members, for fluid flow therebetween, by orifices 34 formed in the beam and through which the gas entering the beam may pass into the channel members 33 and be discharged therefrom into the bed of catalyst passing downwardly over and between channel members. These channel members are formed with the upper portions thereof in the shape of gables, which are preferably louvered as indicated at 35.

Supported from the wall of the reactor 1 by suitable brackets 36, are longitudinally extending vapor tubes 37, which pass through the major extent of the length of the reactor, as from a point above the level 25 of the bed of catalyst supported by the tube sheet 24 and terminating within the beam 32; entering the beam through the top wall thereof. By the described arrangement vapors above the bed 25 pass downwardly through the tubes 37 and are discharged into the beam 32, leaving the beam through orifices 34 for uniform distribution across the bed by the channel members 33. The vapor passes upwardly through the bed of catalyst, being converted thereby and the vapor products formed together with any unreacted vapors are disengaged at the surface 37 of the bed in a plenum provided between that surface and the bottom of the tube sheet 24. An outlet line 38 communicates with the plenum for the discharge of these vapors from the reactor, for transportation to auxiliary equipment for condensation and separation into desired fractions.

To effect uniform withdrawal of catalyst from the reactor, the bottom thereof is made frusto conical in shape, and the reactor is provided with vertically spaced horizontal partitions, in known manner; two of such partitions being shown at 39 and 40. These partitions are provided with apertures spaced in accordance with a predetermined pattern decreasing in the number of such apertures successively from the uppermost to the lowermost of said partitions. Downcomers may be provided in the apertures, if desired, as shown at 41 and 42. At a level immediately below the uppermost partition 39 a pipe 43 enters through a side wall of the reactor, and communicates with a plenum space formed below the underside of that partition.

Referring again to Figure 1 it will be seen that the catalyst discharged from the reactor 1 by means of conduit 3 enters the kiln 2, for combustion of carbonaceous deposit therein, the regenerated catalyst ultimately returning to the transfer hopper 5 through the conduit 4 connecting that hopper with the bottom of the kiln. The particular form of kiln forms no part of the present invention and may be any of the known constructions adapted to handle a descending compact bed of catalyst. In the kiln diagrammatically illustrated, lines 44 and 45 are provided for the introduction of regenerating gas, such as air, into the kiln, and lines 46 and 47 are utilized for the withdrawal of combustion products in the form of flue gas. The kiln is provided with suitable arrangements (not shown) in a known manner for effecting engagement and disengagement of gases with and from the bed of catalyst therein, and with means within the bottom thereof to effect uniform withdrawal of catalyst from the kiln, which may be similar to that adopted in the reactor shown. The kiln may also be provided at appropriate levels thereof with means for withdrawal of heat, such as by indirect cooling coils circulating suitable heat exchange fluid. The line 48 is provided near the discharge outlet of the kiln for the introduction of vapors and gases for purposes hereinafter explained.

The operation of the illustrated system is as follows: freshly regenerated catalyst at its temperature of discharge from the kiln 2 continuously flows by gravity through the conduit 4 into the transfer hopper 5 to form a bed therein. Hydrocarbons in vapor state are passed into the bed through line 11, entering the bed as an annular stream discharged from the sleeve 10 and effecting elevation of catalyst into the lift conduit 6. The auxiliary diffuser gas admitted through line 12 may comprise additional hydrocarbon vapors, but is preferably steam or an inert gas. Steam or inert gas is also admitted through line 13, a portion of which flows upwardly through the conduit 4 to act as a seal gas. The admission of gas through line 13 will not always be necessary since the steam or inert gas admitted into the bottom of the kiln through line 48 may be utilized instead, in instances where the pressure at the bottom of the kiln is above that prevailing at the mouth of the lift conduit; in which event a portion of the vapors admitted through line 48 may be permitted to flow downwardly with the catalyst in conduit 4, the remainder flowing upwardly through the kiln.

The hydrocarbon vapors together with the catalyst suspended thereby and the gases admitted into the transfer hopper 5 flow upwardly through the lift conduit 6 and are discharged into the disengaging vessel 7 as above explained. The hydrocarbon vapors will generally be admitted into the hopper 5 at a temperature below that of the catalyst therein so that heat exchange is effected between the catalyst and the hydrocarbons, thus heating the hydrocarbon vapors to desired reaction temperature, which may be accompanied by conversion of the hydrocarbons to desired extent, depending upon the temperatures reached and the time of contact permitted between the hot catalyst and the vapors.

The hydrocarbon vapors and other accompanying gases discharged from the vessel 7 through the line 14 are brought into the reactor 1, entering the space above the catalyst level 25 therein. Liquid hydrocarbons to be cracked or otherwise converted, admitted through line 26, are discharged onto the surface 25 of the bed effecting vaporization of the liquid by contact with the hot catalyst. In the alternative embodiment employing the thick curtain technique, the atomized liquid will be sprayed on the falling annular curtain of catalyst, effecting at least partial vaporization thereof, any liquid not vaporized on contact being adsorbed in or held on the surface of the catalyst falling onto the bed. Liquid hydrocarbons thus carried into the bed by the catalyst, by remaining in further contact therewith within the bed, will be vaporized and at least partially converted to vapor products.

The vapors and vapor products formed in the bed are disengaged at the surface 25 of the bed and pass upwardly into the space provided thereabove. Thus, the vapors admitted into the reactor through line 14 as well as the vapors formed from the liquid hydrocarbon admitted through line 26 will pass downwardly through the vapor tubes 37 and into the beam 32, since that path offers a lower pressure drop than is encountered in passing through the bed of catalyst supported on the tube sheet 24 and the downcomers depending therefrom.

All of the hydrocarbon vapors entering the beam 32 have been previously subjected to contact with hot catalyst and have been heated to desired reaction temperature. These vapors then pass into the bed of catalyst through the channel members 33 and upwardly through the bed toward their point of disengagement at the upper level 37 of the bed. The vapors are already at reaction temperature and a portion of these may have already been cracked or otherwise converted in previous contact with the catalyst. The desired cracking or conversion is then effected or completed by contact of the hydrocarbon vapors with the lower bed of catalyst, which is accomplished by countercurrent flow facilitating disengagement of the effluent at the surface 37 of the bed even at comparatively high oil feed rates. The reaction products formed are discharged from above the bed level 37 and enter outlet line 38, by means of which line they may be sent to fractionating and treating equipment as is customary in the art.

Before being discharged from the reactor, the catalyst is purged by means of an inert gas such as steam, admitted through line 43, the purge gas passing upwardly through the nipples 41 and being distributed in the bed, ultimately being discharged together with the hydrocarbon vapors through line 38.

The novel arrangement of the tray 16 and the cone 21 is provided to assure substantially uniform distribution of fines over the cross section of the catalyst bed and to prevent segregation of such fines which might otherwise cause concentration thereof in local areas of the bed. In thus distributing the fines substantially equal flow is maintained throughout the bed, avoiding the nonuniformity in the cracking reaction and in the distribution of coke in the catalyst that might otherwise occur if the fines were collected in localized zones of the bed. The catalyst entering the reactor vessel 1 through the conduit 8, whether as a compact column filling the conduit or as a loosely flowing mass therein, is discharged from the conduit 8 into the tray member 16 at a rate in excess of the flow capacity of the central opening 18 therein, so that a portion of the catalyst overflows the peripheral wall of the tray. The entering stream of catalyst in either case forms a compact column immediately above the tray 16 and is divided into a narrower central stream and a surrounding annular stream of catalyst, each of which streams falls downward freely toward the distributing cone 21 below; the central stream falling upon the cone at on near the apex thereof and the surrounding stream falling upon the lateral face of the cone and being mixed with the catalyst moving down the surface of the cone from the apex. Unless a thick curtain of catalyst is required, the annular passageway 22 is of sufficient cross-section to permit free and unimpeded flow of the catalyst therethrough.

The system described may be used with advantage particularly in cracking of hydrocarbons in the presence of known cracking catalysts, preferably in the form of molded pellets of about 2–4 mm. size or spherical beads of approximately the same size. The known types of cracking catalysts including synthetic silica-alumina gel which may contain known promoters or catalytic metal oxides and acid activated clay catalyst such as "Filtrol." In operations in which a catalyst is employed having a comparatively high rate of hydration, as is the case with acid activated clay catalyst, the catalyst may be hydrated prior to its discharge from the kiln to further raise the temperature thereof. Such hydration may be effected in the described system by introduction of steam through line 48.

Whether the thick falling curtain or the direct introduction of liquid on the surface of the bed is employed, the quantity of liquid should be related to the quantity of catalyst contacted therewith and the heat content of the catalyst, to assure substantially complete vaporization of the liquid. By the illustrated arrangement large quantities of liquid can be vaporized, by remaining in contact with the catalyst in the bed supported by the tube sheet 24, without cooling the catalyst to below the temperature desired to be utilized for the cracking or other conversion reaction carried out in the subsequent countercurrent flow of vapors in the catalyst bed therebelow.

By the described arrangement utilizing spaced catalyst beds, one primarily for vaporization of liquid and the other for the conversion of the vapors, certain additional advantages are obtained from the standpoint of uniformity of contact time of the vapors with the catalyst during the principal cracking operation. The bed of catalyst supported by the tube sheet 24 is capable of possible periodic variation in depth as a result of surges occurring in the catalyst flow. If this bed were also employed for the cracking or other conversion of the hydrocarbon vapors, any changes in the bed depth would mean changes in reaction space rate, and would cause variation in degree of conversion and accordingly in resulting products distribution. The lower bed of catalyst in the reactor, however, has a substantially constant bed level at 37 and possibility of variation in space rate is not encountered.

The liquid hydrocarbon charge admitted through line 26 may be any hydrocarbon fraction advantageously charged as liquid, such as a heavy bottoms fraction preferably free from tars and accompanying mineral salts. The vapor charge utilized as lift gas may be overhead vapors from a tar separator operation, which operation may also provide the liquid fraction of the charge. If desired, the liquid charge may be composed of or comprise catalytic gas oil, condensed and separated from the cracked effluent discharged through line 36, and recycled to the cracking reactor in liquid state.

In typical operations utilizing the described system, cracking catalyst in the form of beads or cylindrical pellets of comparatively uniform size (as falling within a size range such that 90% by weight thereof falls within plus or minus 20% of the main particle size) will be employed. The vapor hydrocarbon feed may be admitted through line 11 at a temperature of about 750 to 900° F. to engage the freshly regenerated catalyst admitted to the hopper 5 at a temperature higher than that of the vapors, and generally above 900° and up to about 1100° F. or somewhat above. As a result of heat exchange, which may be accompanied by some conversion of hydrocarbon vapors during contact with the catalyst in lift conduit 6, the catalyst and vapors will substantially reach an equilibrium temperature of about 900–1050° F. The liquid charge, for instance liquid condensate above the boiling point of recovered gasoline from the cracking operation, is discharged through spray nozzle 27 at a temperature of about say 450 to 650° F. Under these conditions and employing weight ratios of catalyst to liquid oil in the range of about 8 to 1 or above, the catalyst and the oil will be at the proper temperature to provide the desired average reaction temperature in the compact bed below the tube sheet 24; usually from about 800–900° F. or somewhat above.

In order to provide the desired reaction temperature and sufficient heat in the catalyst to effect vaporization of the liquid charge, and to supply heat required for the subsequent cracking operation, the catalyst should be admitted to the falling curtain or the upper bed above the tube sheet 24, at a temperature of not less than about 900° F. and preferably at no lower than 950° F. The temperature and quantity of the lift vapors, accordingly, will be regulated with respect to the temperature and quantity of catalyst lifted thereby, so that the indicated catalyst temperature is had for contact with the liquid hydrocarbon feed. Moreover, the conditions of the lift operation with respect to catalyst to vapor ratio and contact time should be so selected as to avoid excessive cracking in the lift at the high temperatures prevailing therein, in order to minimize undesirable production of relatively large amounts of coke and gas, and to avoid complications of uncontrolled acceleration of catalyst velocity incident to increase in vapor volume and further complications that might be otherwise encountered in the disengagement of catalyst from such increased quantities of vapor. As a general rule, in keeping with the stated objectives it is preferred to so operate the lift that the vapors do not remain therein for more than about 10 to 15 seconds and preferably for a shorter time.

The following example illustrates one set of particular conditions that may be employed in practice of the invention:

The vapor charge employed as fresh feed is made up of approximately 82% tar separator overhead fraction from a West Kansas crude oil, said fraction having an API gravity of 31.5 and boiling over the approximate range of 600–1000° F., about 14% vis-breaker gas oil of 24.7 API gravity boiling in the approximate range of 500–1100° F., and the remainder being vis-breaker products of 57.0 API gravity in the gasoline boiling range which may contain some gas.

The combined vapor oil charge is admitted to the lift hopper at a temperature of 840° F. under a pressure of 11.5 p. s. i. gauge together with about 15% by weight steam, the major part of which steam is brought in together with the oil charge admitted to the hopper through line 11, and the remainder of the steam being admitted separately as diffuser gas through line 12. Seal steam is also admitted through line 13.

The catalyst employed is pelleted acid-activated clay of 4 mm. size, which enters the lift hopper from the kiln at a temperature of 1075° F. The ratio of catalyst to hydrocarbon vapors entering the lift is approximately 10/1 by weight.

The catalyst and charge obtain an equilibrium temperature of about 1025° F. during their flow through the lift conduit and are admitted to the reactor 1 at about that temperature.

The liquid feed admitted to the reactor through line 26 is recycled catalytic gas oil, which is supplied at the rate of approximately 85% by weight of fresh oil feed admitted to the lift hopper. The liquid feed, of 28.5 API gravity and boiling over the approximate range of 600–900° F., is admitted at a temperature of 500° F. The vapors produced therefrom, together with the vapors from the lift, then pass down the vapor tubes 37 and upwardly through the bed of catalyst between and above the channel members 33 to complete the desired cracking, producing a vapor effluent which is discharged at about 890° F. and sent to fractionation in known manner. Under the described operation the conversion conditions in contact with the compact bed of catalyst in reactor 9 entail an average temperature of about 900° F., an average pressure of 7.5 p. s. i. gauge, and a catalyst to oil weight ratio of about 5.2/1. About 0.7% to about 0.8% coke by weight of the catalyst will be deposited in the catalyst.

The coked catalyst enters the kiln at about 890° F. and is burned by contact with air, raising the temperature and storing sensible heat therein. After completion of regeneration, the catalyst is contacted with steam to effect hydration thereof, thereby adjusting the temperature to that hereinbefore described for its further use in the process.

Obviously many modifications and variations of the invention as hereinbefore set forth may be made without departing from the spirit and scope thereof and therefore only such limitations should be imposed as are indicated in the appended claims.

I claim as my invention:

1. In a hydrocarbon conversion reactor provided with means for introducing granular contact material into said reactor at the top thereof and means for discharging contact material at the bottom thereof, a horizontal partition within said housing adapted to support a bed of contact material thereon, said partition being provided with a plurality of tubular discharge devices arranged in a pattern to distribute contact material below said partition uniformly over the cross section of said reactor, a narrow horizontal hollow beam spaced below said partition, gas distributing members intersecting said beam, said beam being provided with openings therein at the points of intersection of each of said gas distributing members to permit gas flow from said beam into said distributing members and said distributing members being provided with openings therein permitting flow of such gas into the reactor, said distributing members being spaced below said partition and said discharge devices terminating at a level above said distributing members to provide a conversion zone between said level of termination of said discharge members and said gas distributing members, a longitudinally extending vapor conducting tube passing through said partition, said tube communicating with the interior of said beam and rising vertically upward therefrom, means for introducing vapors into said reactor above said partition, means for withdrawing vapors from said reactor at a level intermediate said partition and the level of termination of said discharge devices, a liquid discharge nozzle within said reactor at a point above said partition, and contact material distributing means above said nozzle arranged to divert contact material passing through said reactor from contact with said discharge nozzle, said contact material distributing means being arranged to discharge contact material toward the upper surface of said partition.

2. Apparatus in accordance with claim 1 wherein said contact material distributing means comprises an upright conical member having its apex in line with said nozzle and the base thereof above said nozzle, a shallow tray member spaced above said conical member and having a central opening approximately in line with the apex of said conical member, said tray member being arranged to receive therein contact material introduced into the top of said reactor, and a concentric housing surrounding said conical member and spaced peripherally from the base of said conical member to provide an annular passageway between said conical member and said housing permitting flow of contact material therethrough.

3. A hydrocarbon conversion reactor comprising an elongated upright vessel internally partitioned by a horizontal tube-sheet to provide upper and lower treating chambers, inlet means for introducing granular contact material at the top of said upper chamber, a plurality of relatively-short conduits depending from said tube-sheet and terminating at a common discharge level within said lower chamber, contact material discharge means at the bottom of said lower chamber adapted to maintain said contact material as a continuous compact moving mass extending upwardly from the bottom of said lower chamber to and through said conduits, to a level within said upper chamber spaced below said contact material inlet means, means for introducing hydrocarbon vapors into the upper region of said upper chamber above the uppermost surface of said compact mass, nozzle means for introducing a downwardly directed spray of liquid hydrocarbons into said upper chamber at a location between said uppermost surface and said contact material inlet means, relatively-long conduits extending from the contact material-free space in the upper region of said upper chamber to an intermediate level within said lower chamber a substantial distance below said discharge level of said short conduits, a vapor distributor communicating with the lower ends of said long conduits and extending horizontally over the cross-sectional area of said lower chamber, and hydrocarbon vapor outlet means at the upper end of said lower chamber located above said discharge level of said short conduits, said conduits being of such relative size that the path of flow for gaseous material successively through the compact bed of contact material in said upper chamber and the compact streams of contact material in said short conduits imposes a substantially greater resistance than the path of flow successively through said long conduits, said distributor, and the portion of the compact bed in said lower chamber extending from the level of said distributor upwardly to said discharge level of said short conduits.

4. Apparatus as defined in claim 3, in which said relatively-long conduits are wholly contained within said vessel and pass through openings in said tube-sheet.

5. Apparatus as defined in claim 3 in which said contact material is introduced into said upper chamber as a free-falling circumferentially-complete curtain, and said liquid hydrocarbons are introduced into the space surrounded by said curtain.

References Cited in the file of this patent

UNITED STATES PATENTS

| | | |
|---|---|---|
| 2,463,623 | Huff | Mar. 8, 1949 |
| 2,464,489 | Crowley | Mar. 15, 1949 |
| 2,469,332 | Evans | May 3, 1949 |
| 2,492,998 | Lassiat | Jan. 3, 1950 |
| 2,548,286 | Bergstrom | Apr. 10, 1951 |
| 2,556,514 | Bergstrom | June 12, 1951 |
| 2,561,771 | Ardern | June 24, 1951 |
| 2,574,503 | Simpson | Nov. 13, 1951 |
| 2,574,850 | Utterback et al. | Nov. 15, 1951 |